(12) United States Patent
Jones (10) Patent No.: US 11,295,351 B2
(45) Date of Patent: Apr. 5, 2022

(54) ADAPTIVE COMMUNICATION SYSTEM INTEGRATED INTO THE WASH FUNCTIONS OF A CARWASH

(71) Applicant: Jeffrey Stewart Jones, Duluth, GA (US)

(72) Inventor: Jeffrey Stewart Jones, Duluth, GA (US)

(73) Assignee: Carwash Marketing Systems, LLC, Duluth, GA (US)

(*) Notice: Subject to any disclaimer, the term of this patent is extended or adjusted under 35 U.S.C. 154(b) by 308 days.

(21) Appl. No.: 16/361,158

(22) Filed: Mar. 21, 2019

(65) Prior Publication Data

US 2019/0295135 A1 Sep. 26, 2019

Related U.S. Application Data

(60) Provisional application No. 62/646,160, filed on Mar. 21, 2018.

(51) Int. Cl.
G06Q 30/02 (2012.01)
B60S 3/00 (2006.01)
B08B 3/04 (2006.01)

(52) U.S. Cl.
CPC ............ G06Q 30/0281 (2013.01); B08B 3/04 (2013.01); B08B 2203/0223 (2013.01); B60S 3/00 (2013.01)

(58) Field of Classification Search
CPC .... G07F 17/20; B60S 3/00; B60S 3/04; B60S 3/004; B60S 1/66; G06Q 30/02
See application file for complete search history.

(56) References Cited

U.S. PATENT DOCUMENTS

| | | | | |
|---|---|---|---|---|
| 4,857,113 A * | 8/1989 | Hodge | ...................... | B60S 3/04 134/32 |
| 7,107,231 B1 * | 9/2006 | Hall | ...................... | G06Q 30/02 705/14.27 |
| 2003/0233153 A1 * | 12/2003 | Grier | ........................ | B60S 3/04 700/11 |
| 2005/0086835 A1 * | 4/2005 | Faytlin | .................... | B60S 3/002 34/666 |
| 2005/0229808 A1 * | 10/2005 | MacDowell | .............. | B60S 3/04 105/157.1 |
| 2006/0144430 A1 * | 7/2006 | Ringdahl | ................ | G07F 17/20 134/123 |
| 2008/0098542 A1 * | 5/2008 | Martin | ...................... | B60S 3/04 15/97.3 |
| 2011/0043379 A1 * | 2/2011 | Auer | ........................ | B60S 3/06 340/928 |
| 2011/0315172 A1 * | 12/2011 | Ennis | ........................ | B60S 3/04 134/123 |

(Continued)

Primary Examiner — Vincent M Cao
(74) Attorney, Agent, or Firm — Dunlap Bennett & Ludwig, PLLC (57) ABSTRACT

An adaptive communication system integrated into the wash functions of a carwash is provided. The adaptive communication system embodies a programmable input relay board coupled to a digital sound trigger board retrievably storing a plurality of communication events. Each wash function is adapted to transmit an output signal upon being engaged. The programmable input relay board is adapted to receive such output signals and interface with the digital sound trigger board so as to selectively activate one or more of the plurality of communication events.

17 Claims, 4 Drawing Sheets

(56) References Cited

U.S. PATENT DOCUMENTS

2014/0224279 A1* 8/2014 Anderson ............... B60S 3/063
                                                    134/18
2016/0264104 A1* 9/2016 Belanger ................ B60S 3/002

* cited by examiner

WASH EXPERIENCE CONFIGURATION DASHBOARD

FUNCTIONS    EFFECTS    BASE EXPERIENCES    CONDITIONAL EXPERIENCES    SETTINGS    PROFILE    LOGOUT

CUSTOMER INPUTS

| REFERENCE | STATE | NAME |
|---|---|---|
| A | O | DELUXE WASH PACKAGE SELECTION |
| B | O | |
| C | O | |
| D | O | |
| E | O | |
| F | O | |
| G | O | |
| H | O | |

WASH OPERATIONS

| REFERENCE | STATE | NAME |
|---|---|---|
| 1 | O | ENTRY PRESOAK |
| 2 | O | STOP |
| 3 | O | HOT WAX APPLICATION |
| 4 | O | RAIN-X APPLICATION |
| 5 | O | FINAL SPOT FREE RINSE |
| 6 | O | |
| 7 | O | |
| 8 | O | |

FIG.3

WASH EXPERIENCE CONFIGURATION DASHBOARD

FUNCTIONS    EFFECTS    BASE EXPERIENCES    CONDITIONAL EXPERIENCES    SETTINGS    PROFILE    LOGOUT

| EFFECT NAME | TYPE | FILE | ACTION | ADD NEW |
|---|---|---|---|---|
| UP SELL MESSAGE FOR ULTIMATE WASH PACKAGE | MARKETING MESSAGE | ▽ DELUXE_ULTIMATE X UPSELL DISCOUT.MP3 | | |
| DRIVE FORWARD MESSAGE | DIRECTIONAL | ▽ DRIVE FORWARD MESSAGE.MP3 | | |
| BACK-UP MESSAGE | DIRECTIONAL | ▽ BACK-UP MESSAGE.MP3 | | |
| HOT WAX SOUND EFFECT | SOUND EFFECT | ▽ HOT WAX FOAMY EFFECT.MP3 | | |
| RAIN-X SOUND EFFECT | SOUND EFFECT | ▽ RAIN-X EFFECT.MP3 | | |
| FINAL RINSE SOUND EFFECT | SOUND EFFECT | ▽ FINAL RINSE EFFECT.MP3 | | |
| SITE INFORMATION | INFORMATION | ▽ SITE INFO_TOKEN USAGE.MP3 | | |
| THANK YOU | INFORMATION | ▽ THANK YOU MESSAGE.MP3 | | |
| TEST | DIRECTIONAL | ▽ THRILLER.MP3 | | |

FIG.4

WASH EXPERIENCE CONFIGURATION DASHBOARD

FUNCTIONS    EFFECTS    BASE EXPERIENCES    CONDITIONAL EXPERIENCES    SETTINGS    PROFILE    LOGOUT

| 1 | ENTRY PRESOAK | | | ADD NEW |
|---|---|---|---|---|
| EFFECT NAME | | DELAY (SECONDS) | ACTION | |

| 2 | STOP | | | ADD NEW |
|---|---|---|---|---|
| EFFECT NAME | | DELAY (SECONDS) | ACTION | |

| 3 | HOT WAX APPLICATION | | | ADD NEW |
|---|---|---|---|---|
| EFFECT NAME | | DELAY (SECONDS) | ACTION | |
| HOT WAX SOUND EFFECT | | ▽ 1 | 📝🗑 | |

| 4 | RAIN-X APPLICATION | | | ADD NEW |
|---|---|---|---|---|
| EFFECT NAME | | DELAY (SECONDS) | ACTION | |
| RAIN-X SOUND EFFECT | | ▽ 1 | 📝🗑 | |

| 5 | FINAL SPOT FREE RINSE | | | ADD NEW |
|---|---|---|---|---|
| EFFECT NAME | | DELAY (SECONDS) | ACTION | |
| FINAL RINSE SOUND EFFECT | | ▽ 1 | 📝🗑 | |
| SITE INFORMATION | | ▽ 20 | 📝🗑 | |
| THANK YOU | | ▽ 30 | 📝🗑 | |

FIG.5

WASH EXPERIENCE CONFIGURATION DASHBOARD

FUNCTIONS    EFFECTS    BASE EXPERIENCES    CONDITIONAL EXPERIENCES    SETTINGS    PROFILE    LOGOUT

| CONDITIONAL EXPERIENCE | | | | ADD NEW CONDITION | |
|---|---|---|---|---|---|
| EXPERIENCE NAME | CONDITIONAL EVENTS | | START DATE | END DATE | ACTION |
| DELUXE UP SELL MESSAGE | ☑☐☐☐☐☐☐☐<br>A B C D E F G H | ☑☑☐☐☐☐☐☐<br>1 2 3 4 5 6 7 8 | 00/00/0000 00:00 | 00/00/0000 00:00 | 📝🗑 |
| EFFECT NAME | DELAY (SECONDS) | ACTION | ADD NEW | | |
| UP SELL MESSAGE FOR ULTIMATE WASH PACKAGE | ▽ 1 | 📝🗑 | | | |

FIG.6

ADAPTIVE COMMUNICATION SYSTEM INTEGRATED INTO THE WASH FUNCTIONS OF A CARWASH

CROSS-REFERENCE TO RELATED APPLICATION

This application claims the benefit of priority of U.S. provisional application No. 62/464,160 filed 21 Mar. 2018, the contents of which are herein incorporated by reference.

BACKGROUND OF THE INVENTION

The present invention relates to communication systems and, more particularly, an adaptive communication system integrated into the wash functions of a carwash.

When going through a car wash, once the customer starts entering the car wash bay or tunnel, there is no way for the operator to customize communications to the consumer based on the wash package selected, even to provide directions, information, or entertainment to enhance the customer's overall experience.

Given that communication primarily comes at the pay station and fixed signage inside the bay or tunnel, a significant opportunity is lost to provide real time configurable communications at various points in the process, wherein such communications can be most relevant, memorable and even entertaining for the customer.

As a result, communication to customers during the wash experience is either by signage, a sales person and/or a point-of-sale system, and once in the bay or tunnel, fixed directional signage is the primary form of communication. Currently, there is no communication system that integrates with the car wash functions, and so there is no adaptive and timely communications while the customer is experiencing the wash process.

Specifically, current systems do not enable voice or sound communication events during the wash process. If the customer does not understand, connect with or forgets these messages after entering the wash, their experience could be degraded. Furthermore, the opportunity is lost to enhance the customer's experience through various music/sound effects at varying points during the wash process. As a result, current systems do not do an optimal job in maximizing the customer in-wash experience.

As can be seen, there is a need for an adaptive communication system integrated into the wash functions of a carwash. The present invention embodies a programmable input relay board coupled to a digital sound trigger board retrievably storing a plurality of communication events. Each wash function is adapted to transmit an output signal upon being engaged, and the programmable input relay board is adapted to receive such output signals and interfacing with the digital sound trigger board so as to selectively activate one or more of the plurality of communication events to external output devices.

Each communication event may be digital data or output associated with a relay or switch on the digital sound trigger board. The digital sound trigger board may include or be coupled to a programmable logic controller making the digital data/communication event and/or the associated relay/switch user-configurable in terms of content and utilization.

In short, when a wash function is initiated during the carwash process the associated output signal is triggered, which in turn the present invention receives and utilizes to provide a desired communication event. Specifically, the output signals may be coupled to the programmable input relay board through its output terminal strip, which utilizes the programmable logic controller to close or engage preselected relays or switches on the digital sound trigger board, triggering one or more communication events associated with said relays/switched. The resulting communication events can be output through external speakers or transmitted digitally to the customer's smart device or car stereo. These communication events can be voice, music and/or sound effect related, thereby enhancing the experience of the customer during the operation of the car wash.

With customer communication being extended into the bay or tunnel, operators can configure effective digital communications that creates a better overall and lasting customer experience. For example, users can create directional (e.g., how to pull into bay/tunnel), informational (e.g., narration and benefits of specific wash operations when activated), entertainment (e.g., themed music or sound affects when certain wash operations are activated) or marketing communications (e.g., upsell messages on services/merchandise or higher end wash packages available while exiting the wash). Thus, extending these types of communication events into the bay or tunnel, and so creating a more engaging customer experience and a higher level of awareness of premium services (e.g., wash packages), onsite services and merchandise the customer could be interested in once exiting the car wash.

SUMMARY OF THE INVENTION

In one aspect of the present invention, an adaptive communication system integrated into the wash functions of a carwash includes the following: a programmable input relay board coupled to a digital sound trigger board; the digital sound trigger board retrievably stores a plurality of communication events; the programmable input relay board providing a plurality of inputs electrically connectable to one or more electrical outputs, wherein each electrical output is operatively associated with a wash function of a car wash so that when said wash function is operable, an output signal is generated, and wherein the programmable input relay board is configured to selectively enable one or more communication events of said plurality of communication events; and one or more external output devices configured to receive and output each communication event.

In another aspect of the present invention, the adaptive communication system integrated into the wash functions of a carwash includes the following: a programmable input relay board coupled to a digital sound trigger board; the digital sound trigger board retrievably stores a plurality of communication events; the programmable input relay board providing a plurality of inputs electrically connectable to one or more electrical outputs, wherein each electrical output is operatively associated with a wash function of a car wash so that when said wash function is operable, an output signal is generated, and wherein the programmable input relay board is configured to selectively enable one or more communication events of said plurality of communication events; one or more external output devices configured to receive and output each communication event, wherein the one or more external output devices includes one of the following: a speaker in a hull of the car wash, a speaker in a smart device of a customer, or a speaker in a vehicle in the hull of the car wash; and one or more conditional relays associated with at least one of said plurality of inputs, wherein the one or more conditional relays provides a time delay prior to the enablement of an associated communication event, wherein a first car wash function is the car wash pay station, and wherein a second car wash function is a hot wax application.

In yet another aspect of the present invention, a method of integrating an adaptive communication system to the wash functions of a carwash includes the following: providing the above-mentioned adaptive communication system integrated into the wash functions of a carwash; and electrically connecting an output of a car wash pay station to a first input of the plurality of inputs of the programmable input relay board.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIGS. 1 through 6, the present invention may include at least one computer with a user interface. The computer may include at least one processing unit coupled to a form of memory. The computer may include, but not limited to, a microprocessor, a server, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

Figure 1:
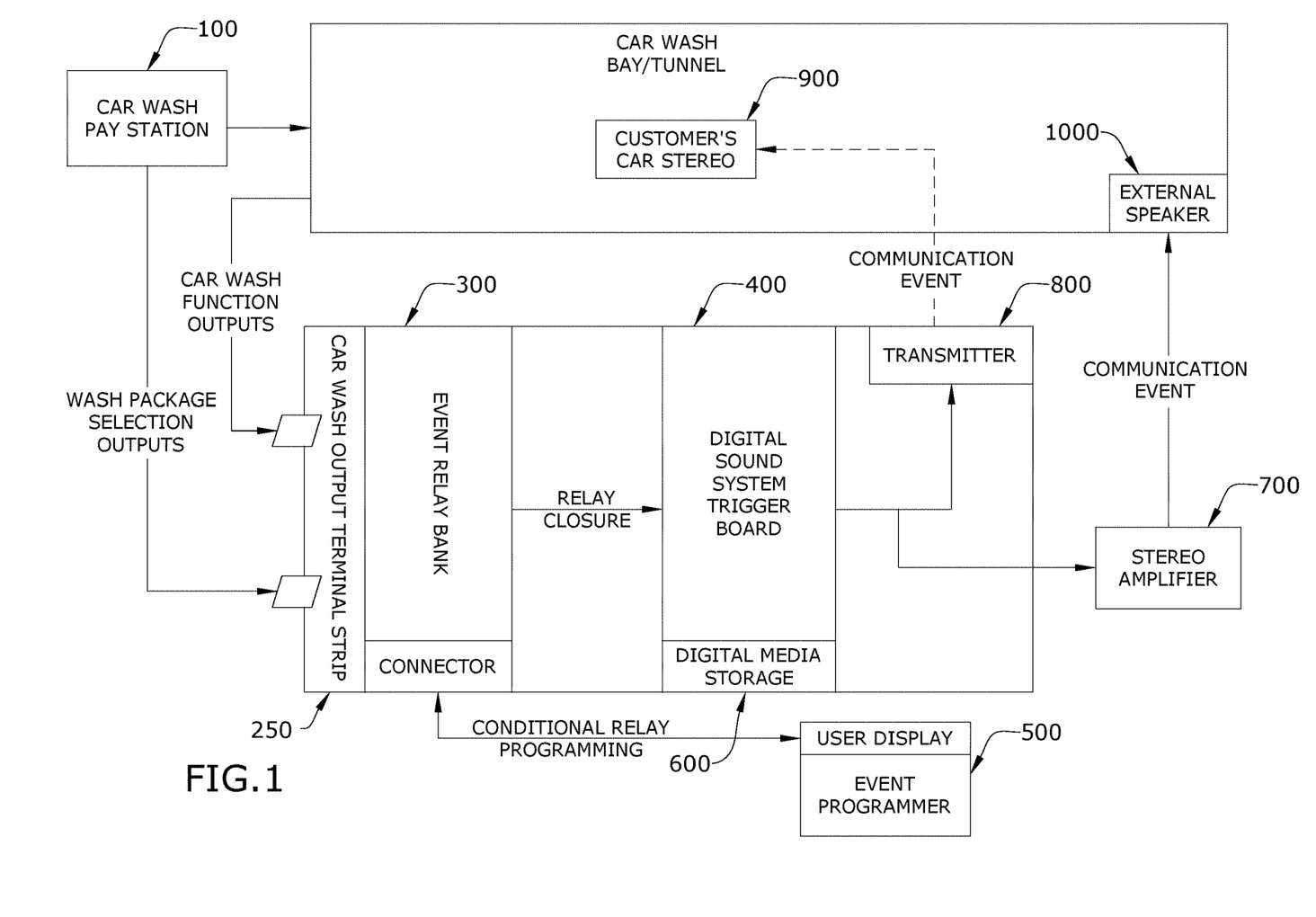
FIG. 1 is a schematic view of an exemplary embodiment of the present invention.

Referring to FIG. 1, the present invention may embody a user-configurable programmable input relay board 300 coupled to a digital sound trigger board 400, wherein the programmable input relay board 300 is adapted to receive electrical output signals for selectively triggering one or more digital data/output ("communication events") retrievably stored by the digital sound trigger board 400.

The electrical output signals may be coupled to the programmable input relay board 300 by way of an output terminal strip 250. The electrical output signals may be generated by the electromechanical functioning of a car wash, but need not be limited to carwash functionality. An example of an electrical output signal could be from the car wash pay station 100, thereby enabling, in effect, a default communication event for all paying customers, with additional communication events available within the car wash as a function of wash functions or non-wash function options selected at the car wash pay station 100.

The communication event may be propagated through external output devices, for example external speakers 1000 or the customer's smart device speakers or car stereo system 900 via a predefined station on a transmitter 800 (e.g., FM transmitter, Bluetooth, etc.).

The present invention includes a programmable logic controller 500 coupled to the programmable input relay board 300. One or more conditional relays may be connected to the programmable logic controller 500 and the programmable input relay board 300. In certain embodiment, a conditional relay may be associated with one or more input of the output terminal strip 250 so that if such input receives an electrical output signal (say, from the operation of a wash function) the associated conditional relay is enabled.

Figure 2:
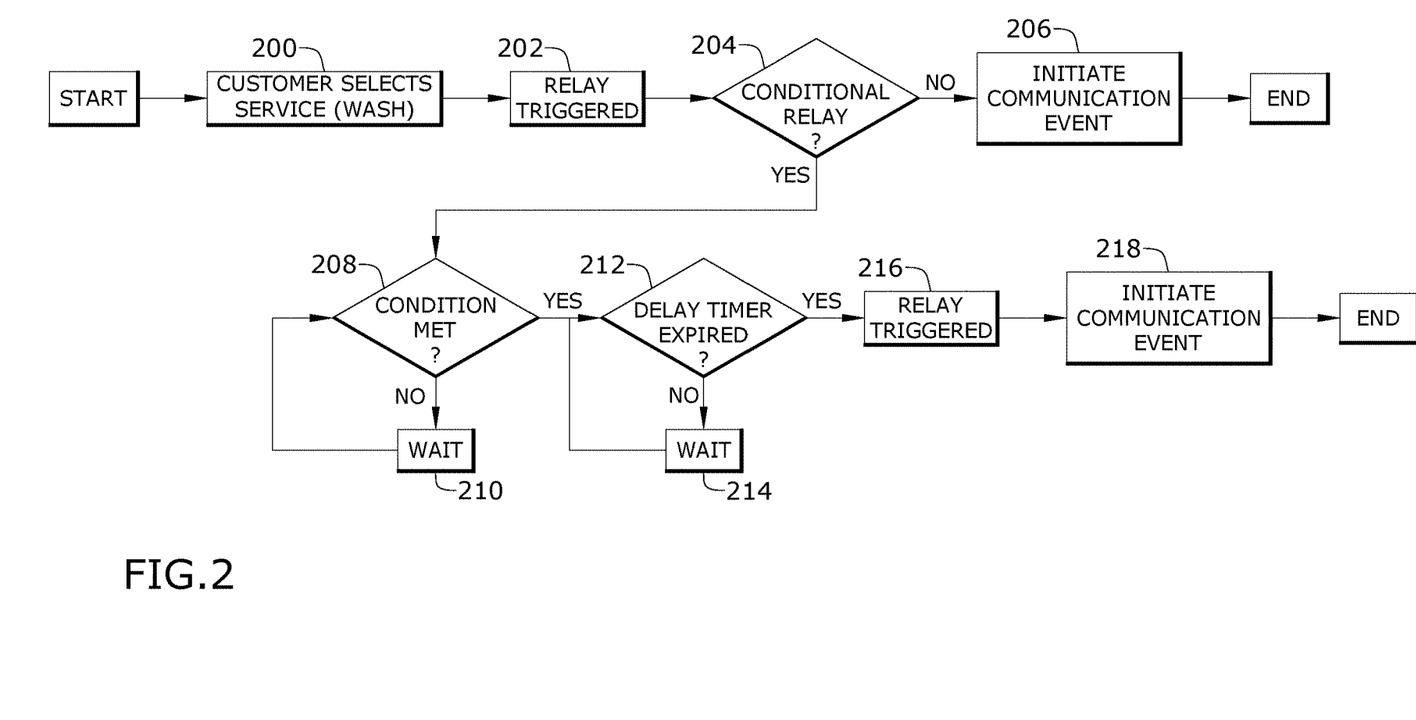
FIG. 2 is a flow chart an exemplary embodiment of the present invention.
Figure 3:
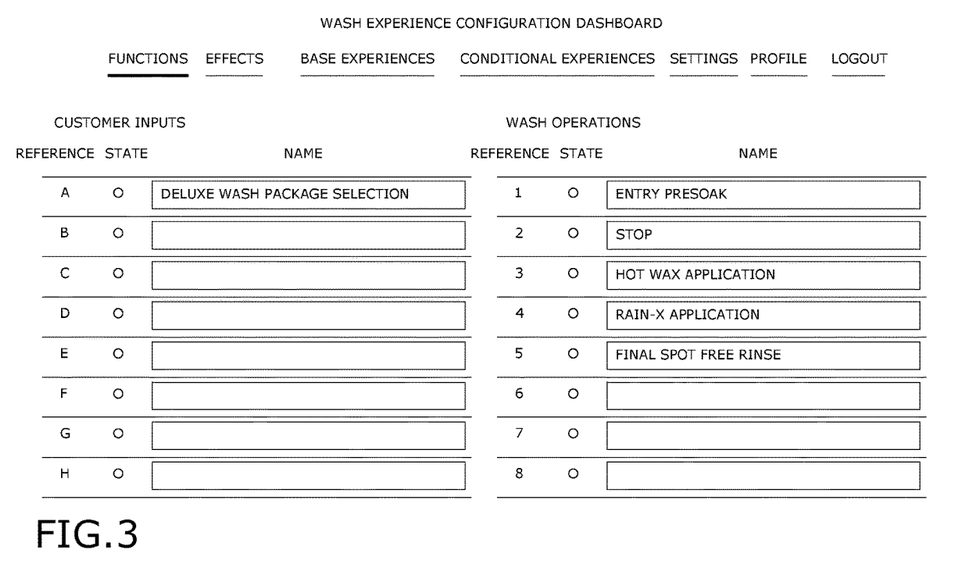
FIG. 3 is a schematic view of an exemplary embodiment of a functions configurable interface of the present invention.
Figure 4:
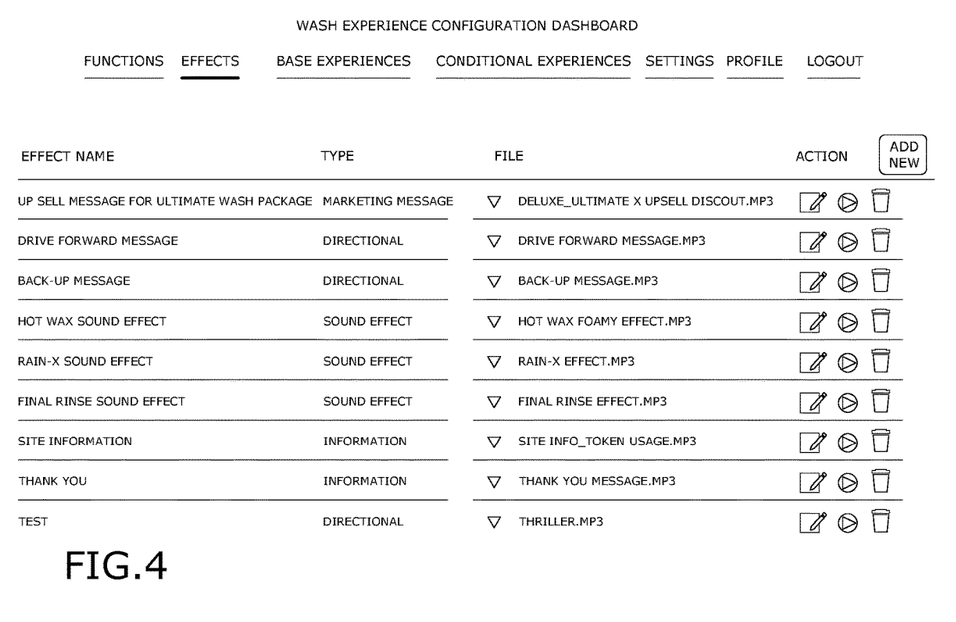
FIG. 4 is a schematic view of an exemplary embodiment of an effects configurable interface of the present invention.
Figure 5:
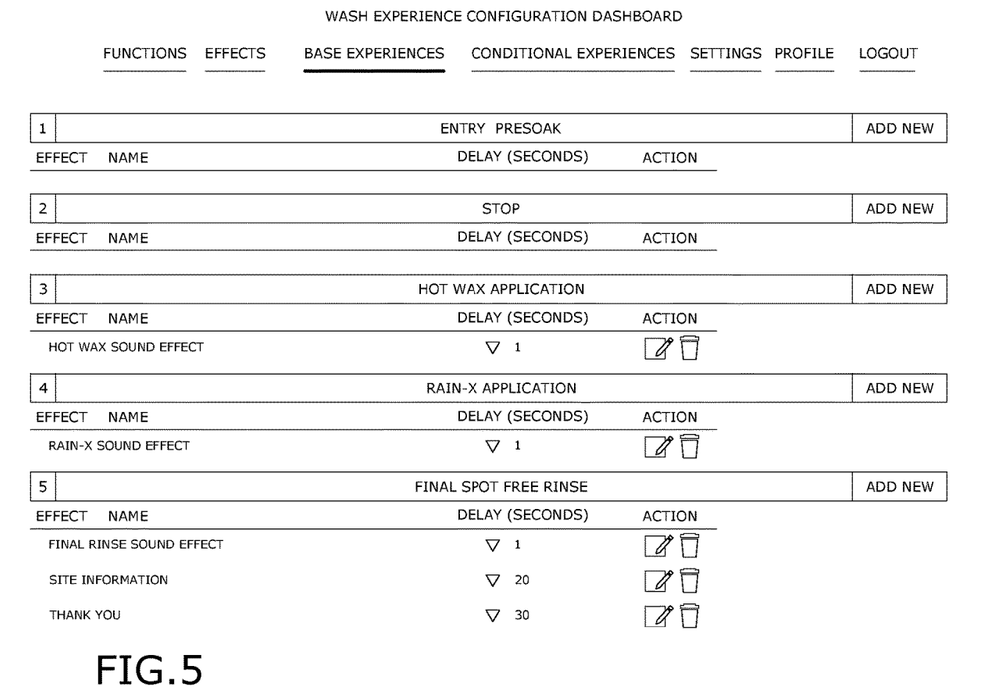
FIG. 5 is a schematic view of an exemplary embodiment of a base experiences configurable interface of the present invention.
Figure 6:
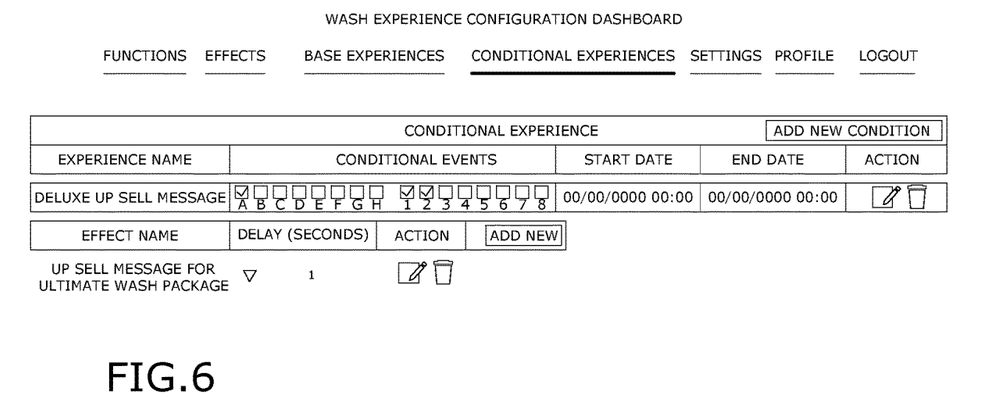
FIG. 6 is a schematic view of an exemplary embodiment of a conditional configurable experiences interface of the present invention.

Referring to FIG. 2, in some embodiments, relay triggering is conditional, i.e., based on a prior event occurring. Where this is the case, the event programmable logic controller 500 will be used to configure the input relay board 300 to trigger conditional relays based on the successful completion of predetermined pre-conditions. Once the consumer selects their desired service 200, at the car wash pay station 100, an electrical output signal triggers a first/default relay 202 (likely via an associated first input of the output terminal strip 250) of the programmable input relay board 300. The programmable logic controller 500 determines if a conditional relay 204 is also associated with said first input. If not, then a first/default communication event may be sent 206 based on a non-conditional relay (i.e., without the further monitoring of additional relay triggers and timing duration thresholds). If a conditional relay is operatively associated an input receiving the electrical output signal, then the system, in certain embodiments the programmable logic controller 500, monitors when that relay trigger has occurred 210. Once conditions are 208 met for the conditional relay, for example the system may check to see if any associated timing delay thresholds 212 has expired, and if so, wait until the thresholds have been reached 214 prior to activating the initiating relay 216, resulting in the transmission of a communication event 218, signaling that all pre-conditions have been satisfied.

In sum, the system can be configured to wait until a certain wash function or functions have been triggered before a conditional event has been deemed satisfied by the system. Once the event has been satisfied, a variable time delay can be added before the actual relay is activated that will ultimately cause the communication event to be transmitted.

Referring to FIGS. 3 through 6, the present invention provides user interface dashboards, in certain embodiments through the programmable logic controller 500, that enables the user to determine and select which car wash functions require a communication event and the contents of said communication event. The output signals coming from the car wash pay station 100 or car wash functions outputs, such as an activated solenoid or sensor, are identified and connected directly into the appropriate output terminal on the input relay board 300 by way of the output terminal strip 250 or equivalent. Any conditional relays may also be identified and programmed using the programmable logic controller 500.

Again, when the wash function is activated, the associated signal may trigger a switch closure on the input relay board 300, which in turn may cause a corresponding switch closure on the digital sound system trigger board 400. This closure will cause the configured digital media to activate, for that input, transmitting the associated digital communication event to the external output devices located in the wash facility, to the customer's smart device and/or vehicle being washed.

To make the present invention, a manufacturer may build an input relay board circuit board with a series of relays that align with the typical electrical outputs for the operations that will be used as the initiators for the communication events. This may include a microprocessor/computer loaded with a program adapted to accept inputs which will allow for the conditional programming for specific relays to close upon meeting pre-determined conditions. The output side of the relays may be designed to pull to ground using minimal voltage.

The manufacturer may connect relays to the digital sound system trigger board 400, which may house the configured digital media in the digital media storage 600 (e.g., Micro SD). The user may create a digital sound file with their specific communication events. This digital file can be created using voice recordings, digital voices (i.e., text-to-speech readers), digital downloads (e.g., music, sounds, etc.) or other known means.

Then the manufacturer may connect the digital sound system trigger board 400 to a stereo amplifier 700, which are electrically coupled to speakers (e.g., external 1000), to distribute the communication event into the car wash bay or tunnel through the digital sound system trigger board 400 to a transmitter 800 (e.g., FM Transmitter). The manufacturer may set the desired frequency that will be used to broadcast inside the customer's car stereo 900.

In one embodiment, the present invention could send the communication event to the customer's mobile device, providing an additional channel communication option for both sound and text messages.

Some elements that a manufacturer may consider may include the following: using a stereo amplifier apart from or in addition to a FM transmitter, procuring one that has the required performance to drive the external speakers and that can accept an external audio input (e.g., MP3 player); procuring speakers that have the required performance to distributed sound in the bay or tunnel and connect to stereo; identifying the operation(s) that will initiate the communication event (e.g., activated stop sign, final rinse, etc.); determining the input power source to these devices (e.g., Stop Sign is activated w/120 VAC, final rinse pump is activated with a 120 VAC solenoid).

During operation, a user may connect power sources to their own relay on the relay input board on the car wash output terminal strip 250 of the event relay bank 300. For example, a stop sign, relay 1; final rinse pump, relay 2; bottom wash package, relay 3; middle wash package: relay 4; top wash package, relay 5; marketing message, relay 6.

If a conditional relay is used, the user may program in the conditions using the event programmer logic controller 500 via the configurable user interfaces illustrated in FIGS. 3 through 6. For example, if a customer does not purchase the top wash package, they'll hear an upselling message that will try and sell them on getting the top wash on their next visit. The system could be configured with the event programmer logic controller 500 as follows: identify conditional relay number and program in (for example, relay 6 is the conditional relay); identify the pre-conditions (e.g., relays that must activate before conditional relay activates, date effectivities, etc.) and program these in (for this example, relays 3, 4 and 2 are the pre-condition relays); define any delays that are required prior to the conditional relay closing (for this example, conditional relay 6 will not close until 30 seconds after Relay 2 closes; thus, the delay entered into the system will be 30 seconds associated with Relay 2); send the updates above to the input relay board for execution; identify the content for each event.

In certain embodiments, the relays may include the following: relay 1: when the stop sign is activated, the message, "Thank You for Using Our Facility and Enjoy your Wash" may be played. relay 2: When the Final Rinse Pump is activated, a sound effect of loud thunder and heavy rain is played. Relay 6: When the conditions are met for Relay 6 to close, the message, "Next time try our Ultimate Wash for an extreme shine with superior protection" may be played.

A user may do the following: create content for communication events onto the configured digital media (e.g., Micro SD MP3) using typical sources (e.g., text-to-voice, music/sound digital downloads, microphone, etc.) and sound editors; assign created events to their respective relay numbers; insert digital media into the digital sound system trigger board 400; set the transmitter frequency for the communication events which may be broadcasted on for the customer to hear inside their car. The system is now ready for use.

Additionally, the present invention could be used in any type of drive through operation such as drive through fast food restaurant, package store, drug store pharmacy pick-up window, etc. that is looking to provide a tailored customer experience based on what the customer purchases/selects.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. An adaptive communication system integrated into the wash functions of a carwash, comprising:
   a programmable input relay board coupled to a digital sound trigger board;
   the digital sound trigger board retrievably stores a plurality of communication events;
   each wash function enabled to send a triggering signal upon activation of said wash function;
   the programmable input relay board providing a plurality of inputs electrically connected to one or more electrical outputs as a function of one or more initial selections of one or more of the wash functions, wherein the programmable input relay board is configured to generate the one or more electrical outputs upon receiving the triggering signal of an initially selected wash function;
   the digital sound trigger board configured to transmit one or more communication events of said plurality of communication events based on the one or more electrical outputs; and
   one or more external output devices configured to receive and output each communication event.

2. The adaptive communication system integrated into the wash functions of a carwash of claim 1, further comprising:
   one or more conditional relays associated with at least one of said plurality of inputs.

3. The adaptive communication system integrated into the wash functions of a carwash of claim 2, wherein the one or more conditional relays provides a time delay prior to the enablement of an associated communication event.

4. The adaptive communication system integrated into the wash functions of a carwash of claim 2, wherein the one or more conditional relays provides a time delay prior to the enablement of an associated communication event.

5. The adaptive communication system integrated into the wash functions of a carwash of claim 1, wherein a first car wash function is the car wash pay station.

6. The adaptive communication system integrated into the wash functions of a carwash of claim 5, wherein a second car wash function is a hot wax application.

7. The adaptive communication system integrated into the wash functions of a carwash of claim 5, wherein a second car wash function is a hot wax application.

8. The adaptive communication system integrated into the wash functions of a carwash of claim 1, wherein one of the one or more external output devices is a speaker in a hull of the car wash.

9. The adaptive communication system integrated into the wash functions of a carwash of claim 1, wherein one of the one or more external output devices is a speaker in a smart device of a customer.

10. The adaptive communication system integrated into the wash functions of a carwash of claim 1, wherein one of the one or more external output devices is a speaker in a vehicle in a hull of the car wash.

11. An adaptive communication system integrated into the wash functions of a carwash, comprising:
    a programmable input relay board coupled to a digital sound trigger board;
    the digital sound trigger board retrievably stores a plurality of communication events;
    each wash function enabled to send a triggering signal upon activation of said wash function;
    the programmable input relay board providing a plurality of inputs electrically connected to one or more electrical outputs as a function of one of more initial selections of one or more of the wash functions, wherein the programmable input relay board is configured to generate the one or more electrical outputs upon receiving the triggering signal of an initially selected wash function;
    two or more conditional relays associated with each of the plurality of inputs;
    the digital sound trigger board configured to transmit one or more communication events of said plurality of communication events based on (a) the one or more electrical outputs and (b) once conditions are met for at least two of the two or more conditional relays; and
    one or more external output devices configured to receive and output each communication event,
    whereby each conditional event is based on a sequence of preconditions.

12. The adaptive communication system integrated into the wash functions of a carwash of claim 1, further comprising:
    one or more conditional relays associated with at least one of said plurality of inputs.

13. The adaptive communication system integrated into the wash functions of a carwash of claim 1, wherein a first car wash function is the car wash pay station.

14. The adaptive communication system integrated into the wash functions of a carwash of claim 1, wherein one of the one or more external output devices is a speaker in a hull of the car wash.

15. The adaptive communication system integrated into the wash functions of a carwash of claim 1, wherein one of the one or more external output devices is a speaker in a smart device of a customer.

16. The adaptive communication system integrated into the wash functions of a carwash of claim 1, wherein one of the one or more external output devices is a speaker in a vehicle in a hull of the car wash.

17. An adaptive communication system integrated into the wash functions of a carwash, comprising:
    a programmable input relay board coupled to a digital sound trigger board;
    the digital sound trigger board retrievably stores a plurality of communication events;
    each wash function enabled to send a triggering signal upon activation of said wash function;
    the programmable input relay board providing a plurality of inputs by way of an output terminal strip electrically connected to one or more electrical outputs as a function of one of more initial selections of one or more of the wash functions, generate the one or more electrical outputs upon generation of an electromechanical functioning of an initially selected wash function;
    the digital sound trigger board configured to transmit one or more communication events of said plurality of communication events based on the one or more electrical outputs;
    one or more external output devices configured to receive and output each communication event, wherein the one or more external output devices includes one of the following: a speaker in a hull of the car wash, a speaker in a smart device of a customer, or a speaker in a vehicle in the hull of the car wash; and
    one or more conditional relays associated with at least one of said plurality of inputs, wherein the one or more conditional relays provides a time delay prior to the enablement of an associated communication event, wherein a first car wash function is the car wash pay station, and wherein a second car wash function is a hot wax application.

* * * * *